United States Patent [19]
Waring

[11] Patent Number: 4,982,066
[45] Date of Patent: Jan. 1, 1991

[54] METHOD OF REHABILITATING PROPELLER HUB BODIES

[75] Inventor: Seabury B. Waring, Rumford, R.I.

[73] Assignee: Bird-Johnson Company, Walpole, Mass.

[21] Appl. No.: 448,744

[22] Filed: Dec. 11, 1989

[51] Int. Cl.$^5$ .............................................. B23K 9/04
[52] U.S. Cl. ........................... 219/137 PS; 29/402.07; 219/76.14
[58] Field of Search .......... 219/76.14, 137 R, 137 PS, 219/130.51; 29/402.07

[56] References Cited
U.S. PATENT DOCUMENTS

| | | | |
|---|---|---|---|
| 3,627,973 | 12/1971 | Smith | 219/76.14 |
| 4,647,749 | 3/1987 | Koshy | 219/76.14 |
| 4,892,990 | 1/1990 | Acheson | 219/76.14 |

Primary Examiner—Clifford C. Shaw
Attorney, Agent, or Firm—Brumbaugh, Graves, Donohue & Raymond

[57] ABSTRACT

A method of rehabilitating a hub body of a controllable pitch propeller of the type having port openings with threads for the bearing rings and seating surfaces for the O-rings of the blade-mounting assemblies comprises the steps of removing the threads, material underlying the threads and material at the O-ring seating surface to expose clean base metal at the port opening, excavating any casting defects in the exposed base metal area of the port opening, filling the excavated areas and all dowel holes with weld metal, grinding the weld metal flush with the adjacent clean base metal surfaces, positioning the hub such that the axis of the port opening is vertical, and applying weld filler material to the port opening by successive passes, starting at the bottom of the port opening and working upwardly, using an automatically and mechanically manipulated welding torch by pulse arc welding so as to lay down a multiplicity of adjacent beads of weld filler material extending circumferentially of the port opening in planes substantially perpendicular to the axis of the port opening.

7 Claims, 2 Drawing Sheets

METHOD OF REHABILITATING PROPELLER HUB BODIES

BACKGROUND OF THE INVENTION

Like many mechanical devices marine controllable pitch propellers ("CPP's") require periodic preventive maintenance and rehabilitation to replace wearing parts for assurance against breakdown or less than optimum operation. The CPP is removed from the vessel and disassembled, and various components, such as seals and bearings, are replaced.

In some designs of CPP's, for example, many CPP's built by Bird-Johnson Company of Walpole, Mass., which are in widespread use, the blades are attached to spindles that rotate for pitch adjustment in blade-mounting port openings in the propeller hub body. The blade-mounting assembly for each blade includes an externally threaded bearing ring that is threaded into internal threads in the port opening. For assurance against unthreading of the bearing ring, several holes are drilled into the hub body and bearing ring at their juncture, and dowels are installed in the holes to lock the bearing ring in place. The port opening also has a seating surface adjacent the bearing ring for an O-ring seal.

At intervals of about five or six years the maintenance procedures for such CPP's call for replacement of the bearing rings, which are, of course, wearing parts. Often, the hub body requires only minor repairs when the sealing rings are replaced. Even though new holes have to be drilled for the locking dowels for the replacement bearing rings, because it is not feasible to reuse the parts of the holes in the hub body for the new dowels, the portions of the dowel holes in the hub body need not be filled.

For a variety of reasons, such as loss of integrity of the threads in the hub body due to too many unused dowel holes from previous reconditionings of the CPP or damaged threads, it is occasionally necessary to recondition one or more of the port openings in the hub body. The threads and the O-ring seating area of the port opening are machined to expose clean base material. Any casting defects in the exposed material and the dowel holes are ground or otherwise excavated. After cleaning to remove any oil residue and oxides in the work area, the excavated areas and the entire thread area and the O-ring seating area of the port opening are built up to restore material for the threads and the proper O-ring seating surface by applying weld filler material. The application of the weld filler material has been done by hand and has required considerable time and great care to avoid thermal stress-cracking and thermal distortion of the hub at the welding site. The hand-welding operation on each hub port may take as long as one week, and sometimes longer, to complete. More often than not, efforts to restore the threaded area with weld metal are unsuccessful because of cracking or distortion.

SUMMARY OF THE INVENTION

An object of the present invention is to provide a procedure for rehabilitating the threaded port openings and O-ring seal surfaces of metal CPP hub bodies that can be accomplished relatively quickly and that ensures to a considerably greater extent than did the previous manual technique against cracking and distortion of the hub body at and near the work site. The foregoing object is attained, according to the invention, by a method comprising the steps of removing the threads, material underlying the threads and material at the O-ring seating surface to expose clean base metal at the port opening, excavating any casting defects in the exposed base metal area of the port opening, filling the excavated areas and all dowel holes with weld metal, grinding the weld metal flush with the adjacent clean base metal surfaces, positioning the hub such that the axis of the port opening is vertical, and applying weld filler material to the port opening by successive passes, starting at the bottom of the port opening and working upwardly, of an automatically and mechanically manipulated welding torch by pulse arc welding so as to lay down a multiplicity of adjacent beads of weld filler material extending circumferentially of the port opening in planes substantially perpendicular to the axis of the port opening.

In preferred practices of the invention the following additional characteristics are present either alone or in combination:

(1) The step of removing material includes eliminating all sharp internal corners in the port opening and forming radiused corners having radii of not less than about one-eighth inch.

(2) For rehabilitation of nickel-aluminum-bronze (Ni-Al-Brz) hub bodies at least two beads of a CuAl-A2 weld filler material are laid down at each radiused corner before additional beads of weld filler material are laid down above them, and the major portion of the beads above each radiused corner are of a Cu-Ni-Al weld filler material.

(3) Also for Ni-Al-Brz hub bodies, a bead of CuAl-A2 weld filler material is laid down after about each one inch of vertical extent of Cu-Ni-Al weld filler material.

(4) The port openings on either side of the one being worked on are braced while the weld filler material is laid down, such as by installing a bearing ring in each of them and applying a generally radially outward load to each such bearing ring.

Machines (robots) for manipulating large work pieces to be welded are commercially available and in widespread use. The use of such a machine to turn the hub relative to a stationary welding torch presents a natural approach to the problem in that it permits ideal "down-hand" welding (laying down a bead on an upwardly facing surface). The present invention represents a unique approach in that the torch is rotated relative to the stationary work-piece, and a more difficult progressive vertical "climb-welding" technique is used. The invention has the important advantage of offering flexibility in the selection of the repair site in that the manipulator is portable. Also, the same equipment can be used with a range of hub sizes.

The use of automated welding allows for weld bead placement that is consistent and even, which reduces the degree of residual welding stress and distortion to adjacent finished machine areas. The success of the weld method of the invention is in large part due to the use of pulse arc welding. Pulse arc welding allows for larger weld metal deposits in a single pass, which reduces heat input and, therefore, distortion in the hub being welded. Other welding methods require several layers of beads to build up the required layer of weld metal for the threads.

For a better understanding of the invention, reference may be made to the following description of an exemplary embodiment, taken in conjunction with the accompanying drawings.

DESCRIPTION OF THE EMBODIMENT

Figure 1:
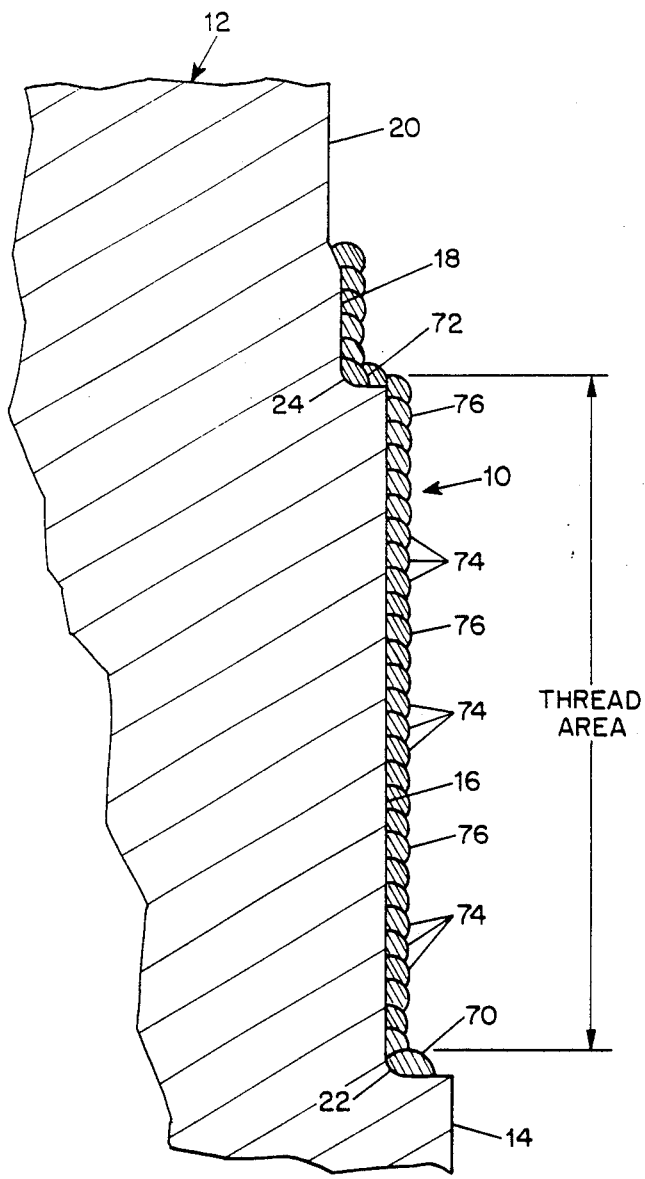
FIG. 1 is a fragmentary cross-sectional view of the portion of the CPP hub body at the port opening after it has been prepared and rebuilt with weld material, the section being taken along a radial plane with respect to the axis of the port opening.

The embodiment of the rehabilitation process described below is for a typical port opening 10 in a Ni-Al-Brz hub body 12 of a CPP. As shown in FIG. 1, the port opening is bounded by a stepped circular cylindrical wall having a radially innermost portion 14 which receives the lower external flange portion of an annular blade mounting ring (not shown) to which the propeller blade flange is fastened by bolts. A threaded portion 16 receives the bearing ring (not shown), which forms a plain bearing with the mounting ring for rotation of the propeller blade in the hub and retains the mounting ring in the opening. The port opening is sealed by an O-ring carried by a sealing ring (not shown) that is captured between the propeller blade flange and the bearing ring. The O-ring seats against an O-ring seal surface 18 of the port opening 10. The perimeter of the propeller blade flange (not shown) is recessed in the radially outer wall portion 20.

When the propeller is reconditioned, it is disassembled and the seals, the bearing rings and any damaged or worn components are replaced. Reconditioning of the hub body may require (1) providing new threads in the threaded portion 16 of the port opening and (2) rebuilding of the O-ring seal surface 18. The threads may be damaged, there may be an excessive number of locking dowel holes and consequent loss of integrity of the threads, or both. The seal surface 18 is often corroded or subject to future corrosion sufficiently to prevent a new seal from seating properly or to present a risk of loss of sealing during the next service period.

The repair procedure for the port opening begins with the removal by machining of the thread area 16 and the O-ring seal surface 18. The thread area 16 is machined to remove the threads plus an additional 0.015" on a side beyond the bases of threads (i.e., to the O.D. of the threads +0.030" diameter). The O-ring seal surface 18 is machined to 0.005" on a side (0.010" diameter) larger than its design diameter to remove oxides. The surface finish of the machined areas is 125 RMS. It is very important to machine or grind the inside corners 22 and 24 at the steps of the port opening to a 0.125" minimum radius and a finish of 125 RMS; sharp inside corners will almost invariably crack when the surfaces are rebuilt due to the welding stresses, thus requiring extensive weld repairs.

All machined surfaces are tested by a liquid penetrant test in accordance with NAVSHIPS 0900-LP-003-8000, Metal Surface Inspection, to identify any open casting flaws that may be present. The hub bodies may be either centrifugally or static cast. It has been observed that the static cast hub bodies usually contain areas of porosity and shrink in the weld repair areas. These areas are also exposed to oil during operation. The open casting flaws retain some of the oil, which must be completely removed before the welding sequence.

Figure 2:
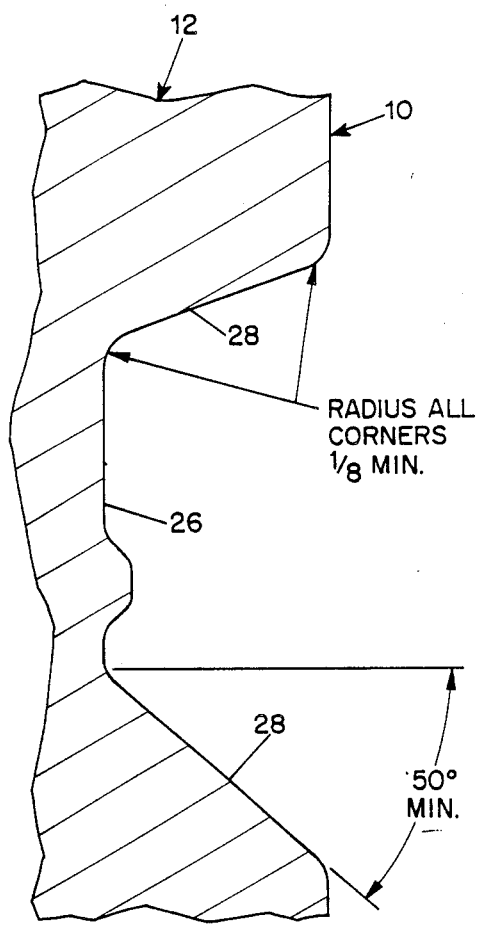
FIG. 2 is a fragmentary cross-sectional view of a typical excavation of a casting defect in the hub body at the site of reconditioning.

Excavation of casting flaws in the weld repair is accomplished by grinding with bonded silicon carbide wheels or die ball grinding tools. The excavated area is extended until sound base material has been reached, and the repair area must have a smooth surface finish (250 RMS). FIG. 2 illustrates a typical excavation 26. The lateral walls 28 of the excavation 26 are tapered divergently at an included angle of 50° minimum, and all corners are radiused to 0.125" minimum, as indicated. The excavated area is then cleaned with Magnaflux Safety Solvent and a clean cloth. On deep excavations (areas that exceed $\frac{1}{4}$" in depth) it will be necessary to pass a neutral oxy-acetylene flame over the area to ensure that all of the oil has been removed. The flame will turn a blue color if oil deposits are present, indicating that further cleaning or grinding is required.

The Gas Metal Arc Welding process is used to repair the excavated areas. Ampcotrode 10 (CuAl-A2)) weld material or the equivalent is used to fill in the excavated areas. If the repair area is located in an area that will come in contact with seawater, such as the O-ring seal area 18, then the last two weld passes are made using Ampcotrode 46 (Cu-Ni-Al) Ni-Al) weld material. The specific welding parameters are described below.

The dowel holes that are present in the threaded area of the port are also welded at this time. The Gas Tungsten Arc Welding process is used with Ampcotrode 10 weld material. The welds at the excavated areas 26 and the dowel pin holes are then ground flush with the adjacent port wall surface.

Figure 3:
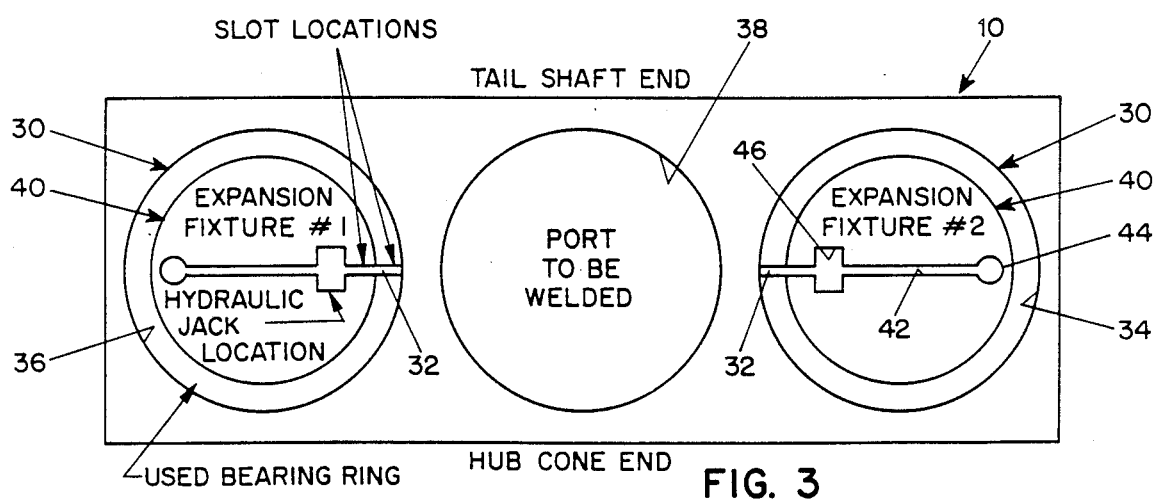
FIG. 3 is a developmental and diagrammatic plan view of three adjacent hub body ports, the outer two of which are braced by fixtures while the center one is being welded.

It is necessary to support or brace the adjacent threaded port areas during the welding sequence, except that if all of the hub body ports require welding, then this fixturing is not required. Used bearing rings 30 (FIG. 3) that contain too many dowel holes but have acceptable threads can be used for this operation. Each bearing ring 30 is saw cut radially along a line 32 perpendicular to the thread. Moly-Coat lubricant is then applied to the threads. A ring 30 is then screwed into each of the ports 34, 36 adjacent the port 38 to be welded. An expansion fixture 40 is then placed on the I.D. of each bearing ring. The expansion fixture 40 is a metal disc having a diameter +0.000" to −0.010" of the I.D. of the bearing ring and having a diametrical slot 42 almost entirely across it to form two semi-cylindrical portions joined by a segment 44. An opening 46 receives a 30-ton hydraulic jack (not shown). The cut 32 of the bearing ring 30 and the slot 42 of the fixture 40 should be located in line with the axis of the port 38 being welded (FIG. 3). The 30-ton jack with a shut-off valve is placed into each fixture 40. The piston is extended until the diameter of the O-ring surface 18 of the port 34, 36 has expanded 0.005".

The actual welding of the hub port threaded area 16 is performed using a welding manipulator 50 (see FIG. 4) which is mounted on the center post of the port. With this manipulator it is possible to weld various hub body sizes by simply changing the center post adapter plates of the manipulator. The hub body 12 is placed in a horizontal position with the center post 52 of the port being welded facing upright. On large hubs it is desirable to place a platform 54 around the hub body to enable the welder to set up as well as observe the welding operation. The desired center post adapter plate 56 is attached to the welding manipulator by four equally spaced, radially extending bolts, which allows the plate to be centered on the center post 52 of the hub body 12 by adjusting the four bolts. The adapter plate 56 has an external ring gear at its perimeter. The base 58 of the manipulator 50 is a ring that is received rotatably on the adapter plate 52 and carries an adjustable bracket assembly 60 for the welding torch 62 that enables the orientation and location of the torch to be set up for each weld bead. A gear driven by a variable-speed motor drive 64 meshes with the ring gear on the adaptor plate. In operation the manipulator "walks" around the adaptor plate 56 to pass the welding torch along the circumferential path of the weld bead then being formed.

Figure 4:
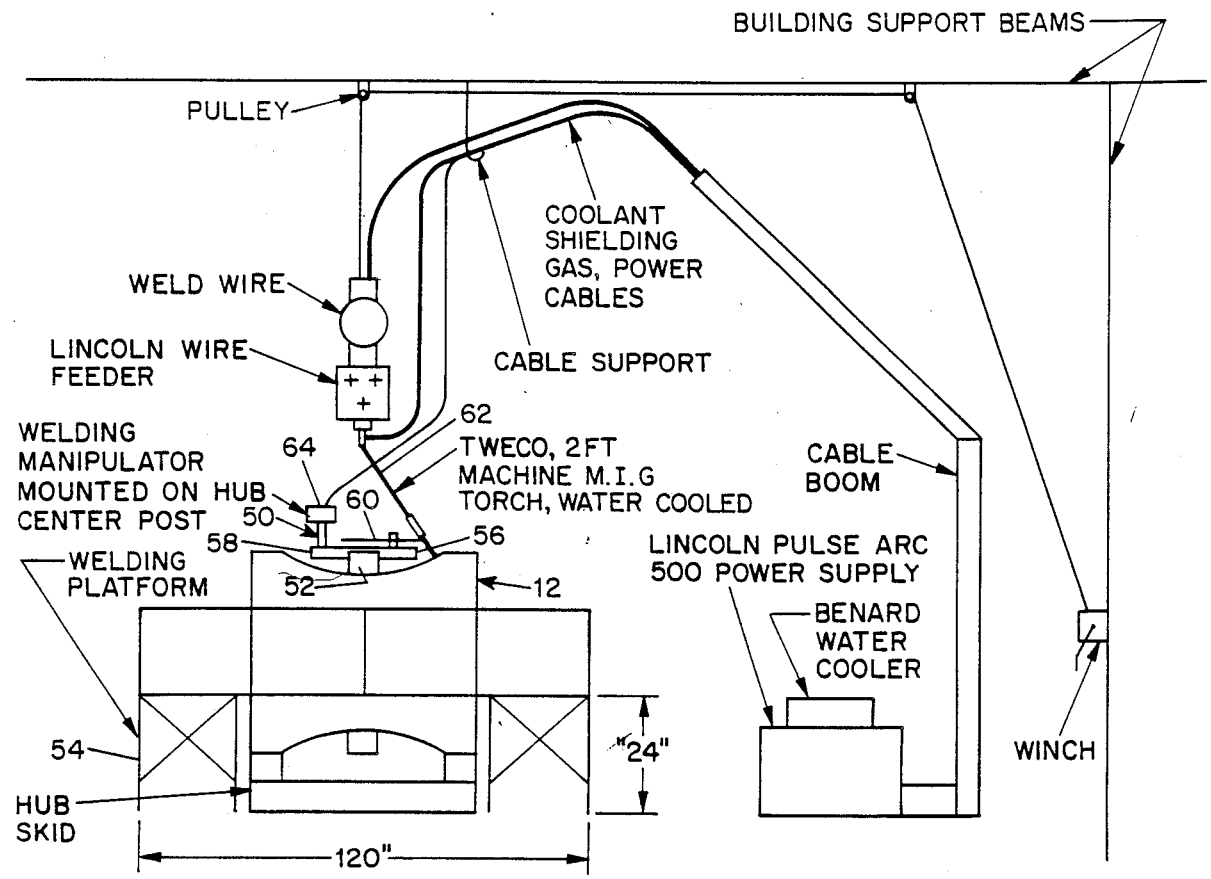
FIG. 4 is a generally schematic elevational view of welding equipment suitable for use in carrying out the procedure.

FIG. 4 shows, and has legends identifying, the pieces of welding equipment associated with the manipulator and torch and a suitable arrangement for setting up and rigging them. A verbal description of the equipment in this specification is, therefore, unnecessary.

Example

Below is a listing of the materials, equipment, and procedures used in an example of the welding process for rebuilding the thread area 16 and O-ring seal surface 18 of the port 10 of the nickel-aluminum-bronze hub body 12.

Base Material (Hub Body)
Cast, nickel-aluminum-bronze
Group Number: S-36-A
Ni-Al-Brz: MIL-B-21230A, Alloy I
Ni-Al-Brz: MIL-B-24480A
ASTM Number: B-148

|  | Composition (% by wt.) |
| --- | --- |
| Copper | 78 Min. |
| Zinc |  |
| Manganese | 3.5 |
| Aluminum | 8.5–11.0 |
| Nickel | 3.0–5.5 |
| Iron | 3.0–5.0 |
| Tin |  |
| Lead | 0.03 |
| Silicon |  |
| Total Others | 0.50 |

Mechanical Properties (as cast):

| Tensile Strength | Yield Strength | % Elongation (2") |
| --- | --- | --- |
| 85,000 psi | 35,000 psi | 30 |

Welding Process
Gas Metal Arc Welding
Weld Filler Materials

| Ampcotrode 46 | Ampcotrode 10 |
| --- | --- |
| Group Number: A-37B | Group Number: A-36B |
| MIL-E-23765/3 | MIL-3-23765/3 |
| MIL-Cu-Ni-Al | MIL-CuAl-A2 |

Qualified Welding Range
3/16"–8.0"
Power Source
Lincoln Electric Pulsed Arc 500
Electrical Characteristics
Direct Current
Reverse Polarity
Amperage Range:

| Filler Material Diameter | Amperage Range |
| --- | --- |
| .062 | 275–290 |

Voltage Range: 30–31.5, Pulse Setting 67
Wire Speed Range: 220–235 IPM
Travel Speed Range
12.0–14.0 IPM
Position
Flat (1 g)
Torch Type
Tweco, MC 400 amp, water-cooled, 30 degree angle
Shielding Gas
Argon/Helium (75% Ar, 25% He)
50–55 CFH flow rate
Purge Gas
None
Gas Cup Type and Size
Brass
⅝" I.D.
Interpass Cleaning
Austenitic stainless steel wire brush or grind
Preheat and Interpass Temperature
Preheat Min. 60F
Interpass Temperature Range: 60–150F The maximum interpass temperature is monitored by a heat indicating crayon (sulfur free) or a contact pyrometer. The temperature is measured 1.0" away from the weld area.

Postweld Heat Treatment
None
Peening

Peening of the weld deposit is not required for a normal weld repair. However, it is possible that some castings may be somewhat crack sensitive in areas. If an area is found to be sensitive, then the weld in that area should be peened. The weld bead length should not exceed 3.0" in length. Peening should start within 5 seconds after the weld bead has been completed. Peening is accomplished with a blunt nose chisel powered by an air hammer. Peening of the base material and the final weld layer is to be avoided.

Weld Joint and Technique

As shown in FIG. 1, weld beads are successively placed along the thread area 16 and the O-ring seal surface 18. The first weld beads 70, 72 to be formed are in the corners 22 and 24 and are made using the Ampcotrode 10 weld material. As discussed above, these corners require a ⅛" minimum radius in order to avoid cracking. Even with this precaution the excessive weld stress that Ampcotrode 46 filler material applies is sufficient to cause these areas to fracture. A minimum of two weld beads in each corner 22, 24 with Ampcotrode 10 weld material are required.

At this point the actual repair welding with Ampcotrode 46 filler material can begin. Starting at the bottom of the thread area 16 above the Ampcotrode 10 weld beads 70, the weld beads 74 are placed on top of each other. It is important to keep each weld bead even with the previous bead. The torch angle is 45 degrees with respect to the hub axis. The leading angle of the torch is 30 degrees, which will allow adequate shielding gas to flow ahead of the weld puddle. The weld puddle should wash slightly against the hub body. If the bead is too close then undercutting of the hub side wall will become apparent. As the hub body temperature increases it will become necessary to increase the travel speed slightly (approximately 14 IPM) at the weld start, then gradually reduce it to 13 IPM. This will prevent lumpy starts. On hub bodies where the port diameter is larger than 30.00" two beads 76 of Ampcotrode 10 are formed after every eight beads 74 of Ampcotrode 46. This will reduce the welding stress in the port area.

When welding on the O-ring seal area 18, it may be necessary to weld a portion using the Gas Tungsten Arc Welding process due to thin base material. The welding parameters for these welds are given below.

After the welding has been completed in the repair area, the fixturing in the adjacent ports (FIG. 3) is removed, and the welded port is machined to within 0.062" on a side of the finished diameter. At this time the repair area is liquid-penetrant inspected. All rejectable indications are then repaired. The adjacent ports as well as both ends of the hub body should be dimensionally inspected at this time. Once the hub body has been inspected and found to be acceptable, the final machining may then be completed.

Minor Repairs

The process listed and described below is used to correct undercut, small excavated areas and to fill in the dowel pin holes.

Welding Process
Gas Tungsten Arc Welding
Weld Filler Materials

| Ampcotrode 46 | Ampcotrode 10 |
| --- | --- |
| Group Number: A-37B | Group Number: A-36B |
| MIL-E-23765/3 | MIL-3-23765/3 |
| MIL—Cu—Ni—Al | MIL—CuAl—A2 |

Qualified Welding Range
3/16"–1.5"
Power Source
Constant current power supply with a high frequency arc start control such as Miller AB/P 330.
Electrical Characteristics
Direct Current
Straight Polarity
Amperage Range:

| Filler Material Diameter | Amperage Range |
| --- | --- |
| 3/32" | 180–200 |

Position
Flat (1 g)
Electrode (GTAW)
2% Thoriated Tungsten
⅛" Diameter
Torch Type
C. K. 200 water-cooled
Shielding Gas
Argon 99.995% pure
20–25 CFH flow rate
Purge Gas
None Gas Cup Type and Size
Ceramic
¾" I.D.
⅜" gas lens
Interpass Cleaning
Austenitic stainless steel wire brush or grind
Preheat and Interpass Temperature
Preheat Min. 60F
Interpass Temperature Range: 60–150F The maximum interpass temperature is monitored by a heat indicating crayon (sulfur free) or a contact pyrometer. The temperature is measured 1.0" away from the weld area.

Postweld Heat Treatment
None

Peening

Peening of the weld deposit is not required for a normal weld repair. However, it is possible that some castings may be somewhat crack sensitive in areas. If an area is found to be sensitive, then the weld in that area should then be peened. The weld bead length should not exceed 3.0" in length. Peening should start within 5 seconds after the weld bead has been completed. Peening is accomplished with a blunt nose chisel powered by an air hammer. Peening of the base material and the final weld layer is to be avoided.

Weld Technique

The forehand welding technique is used.

Inspection

Welding repairs, excavations, and the final weld deposit in the rough machined state shall be visually as well as liquid penetrant examined in accordance with the following specifications: MIL-STD-278E, Fabrication, Welding, and Inspection and Casting, Inspection and Repair for Machining, Piping and Pressure Vessels, Mar. 29, 1976. NAVSHIP 0900-LP-003-8000, Metal Surface, Inspection Acceptance Standards, Table 1, September 1967. DOD-STD-2185(SH), Repair of Bronze Propellers, Oct. 28, 1986.

I claim:

1. A method of rehabilitating a metal hub body of a controllable pitch propeller of the type having port openings that receive propeller blade-mounting assemblies and include threads for bearing rings of the blade-mounting assemblies and seating surfaces for O-rings of the blade-mounting assemblies comprising the steps of removing the threads, material underlying the threads and material at the O-ring seating surface to expose clean base metal at the port opening, excavating any casting defects in the exposed base metal area of the port opening, filling the excavated areas and all dowel holes with weld metal, grinding the weld metal flush with the adjacent clean base metal surfaces, positioning the hub such that the axis of the port opening is vertical, and applying weld filler material to the port opening by successive passes, starting the bottom of the port opening and working upwardly, of an automatically and mechanically manipulated welding torch operated by pulse arc welding so as to lay down a multiplicity of adjacent beads of weld filler material extending circumferentially of the port opening in planes substantially perpendicular to the axis of the port opening.

2. A method according to claim 1 wherein the step of removing material includes eliminating all sharp internal corners in the port opening and forming radiused corners having radii of not less than about one-eighth inch.

3. A method according to claim 2 in which the hub body is of cast nickel-aluminum-bronze and wherein at least two beads of a CuAl-A2 weld filler material are laid down at each radiused corner before additional beads of weld filler material are laid down above them, whereby thermal stress at each radiused corner is minimized.

4. A method according to claim 3 wherein the major portion of the beads above each radiused corner are of a Cu-Ni-Al weld filler material.

5. A method according to claim 4 wherein a bead of a CuAl-A2 weld filler material is laid down after about each one inch of vertical extent of Cu-Ni-Al weld filler material.

6. A method according to claim 1 and further comprising the step of bracing the port openings on either side of the one being worked on while the weld filler material is laid down.

7. A method according to claim 6 wherein the port openings are braced by installing in each of them a bearing ring having a radial saw-cut and applying a generally radially outward load to each such bearing ring.

* * * * *